United States Patent
Suzuki et al.

(10) Patent No.: US 10,158,744 B2
(45) Date of Patent: Dec. 18, 2018

(54) TERMINAL DEVICE AND SUPPORT COMPONENT

(71) Applicant: FUJITSU LIMITED, Kawasaki-shi, Kanagawa (JP)

(72) Inventors: Kenji Suzuki, Kawasaki (JP); Yasufumi Yamamoto, Kawasaki (JP); Yoshiyuki Sando, Kawasaki (JP)

( * ) Notice: Subject to any disclaimer, the term of this patent is extended or adjusted under 35 U.S.C. 154(b) by 0 days.

(21) Appl. No.: 15/680,420

(22) Filed: Aug. 18, 2017

(65) Prior Publication Data

US 2018/0063302 A1  Mar. 1, 2018

(30) Foreign Application Priority Data

Aug. 25, 2016  (JP) .................. 2016-164942

(51) Int. Cl.
*H04M 1/02* (2006.01)
*G06F 1/16* (2006.01)
*H04B 1/3888* (2015.01)
*H04W 88/02* (2009.01)

(52) U.S. Cl.
CPC ........ *H04M 1/0249* (2013.01); *G06F 1/1628* (2013.01); *H04B 1/3888* (2013.01); *H04W 88/02* (2013.01)

(58) Field of Classification Search
CPC .. H04M 1/0249; G06F 1/1628; H04B 1/3888; H04W 88/02
USPC .................................. 361/679.09
See application file for complete search history.

(56) References Cited

U.S. PATENT DOCUMENTS

| 7,221,563 B2 * | 5/2007 | Liu ...................... G06F 1/1607 361/679.21 |
| 7,652,873 B2 * | 1/2010 | Lee ...................... E05B 65/006 248/917 |
| 8,775,710 B1 * | 7/2014 | Miller .................. G06F 1/1626 361/679.17 |
| 8,950,715 B2 * | 2/2015 | Chiu .................... F16M 11/041 248/126 |

(Continued)

FOREIGN PATENT DOCUMENTS

| JP | 10-262104 | 9/1998 |
| JP | 2001-337743 | 12/2001 |
| JP | 2010-109150 | 5/2010 |

(Continued)

*Primary Examiner* — Tuan T Dinh
*Assistant Examiner* — Rockshana D Chowdhury
(74) *Attorney, Agent, or Firm* — Harness, Dickey & Pierce, P.L.C.

(57) ABSTRACT

A terminal device includes a support component including first and second support parts that are laterally symmetrically arranged with respect to a center axis and each locks a strap; and a case including a first wall part, a second wall part provided continuous with the first wall part at one end portion of the first wall part and a third wall part provided continuous with the first wall part at the other end portion of the first wall part, each of the first, second and third wall parts including respective opening parts through which the strap pass, wherein the support component is mounted to each of a first corner part formed with the first and second wall parts and a second corner part formed with the first and third wall parts, and at least one of the first and second support parts is exposed from each of the opening parts.

10 Claims, 13 Drawing Sheets

(56) References Cited

U.S. PATENT DOCUMENTS

2001/0048586 A1    12/2001  Itou et al.
2010/0149739 A1*  6/2010  Mish .................. G06F 1/1626
                                                              361/679.02

FOREIGN PATENT DOCUMENTS

JP          2013-65679     4/2013
JP          2014-121057   6/2014

* cited by examiner

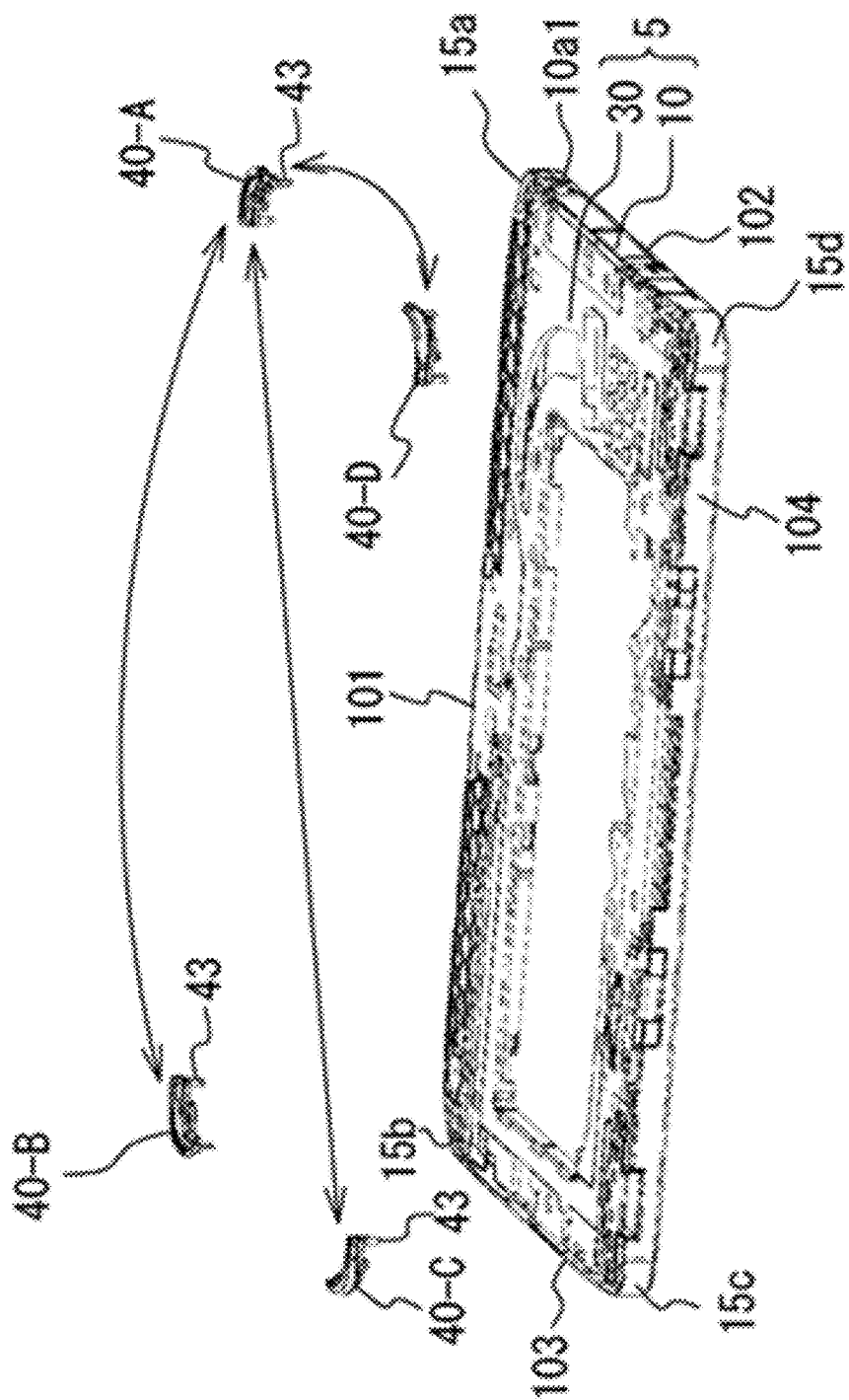

TERMINAL DEVICE AND SUPPORT COMPONENT

CROSS-REFERENCE TO RELATED APPLICATION

This application is based upon and claims the benefit of priority of the prior Japanese Patent Application No. 2016-164942, filed on Aug. 25, 2016, the entire contents of which are incorporated herein by reference.

FIELD

The embodiments discussed herein are related to a terminal device and a support component.

BACKGROUND

A case of a terminal device, such as a smartphone, a tablet personal computer (PC), a game machine, includes a locking part for a strap.

Related technologies are disclosed in Japanese Laid-open Patent Publication Nos. 2010-109150 and 2013-65679.

SUMMARY

According to an aspect of the embodiments, a terminal device includes: a support component including a first support part and a second support part that are laterally symmetrically arranged with respect to a center axis and each locks a strap; and a case including a first wall part of a rectangular frame-shaped part, a second wall part provided so as to be continuous with the first wall part at one end portion of the first wall part and a third wall part provided so as to be continuous with the first wall part at the other end portion of the first wall part, each of the first wall part, the second wall part and the third wall part including respective opening parts through which the strap pass, wherein the support component is mounted to each of a first corner part formed with the first wall part and the second wall part and a second corner part formed with the first wall part and the third wall part, and at least one of the first support part and the second support part is exposed from each of the opening parts.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 illustrates an example in a case where support components that are disposed to four corner parts are exchanged;

DESCRIPTION OF EMBODIMENTS

A locking part for a strap that is included in a case of a terminal device may be damaged due to, for example, various causes. In a case where a locking part is damaged or other cases, in order to avoid replacement of a case itself to which the locking part is provided, for example, a member including a strap attaching part is formed so as to be replaceable.

For example, a strap is mounted by the replacement of a member including the strap attaching part. However, it may be impossible to mount the strap before a new member for the replacement is obtained.

For example, when a support part that is included in the terminal device and locks a strap is damaged, an early recover to a state where the strap is available may be performed.

In the following drawings, sizes, ratios, and others of respective parts may not be illustrated so as to entirely match the actual ones in some cases. In some drawings, for convenience of explanation, a component that is actually present may be omitted, or the size may be illustrated by being expanded to be larger than the actual one in some cases.

Figure 1A:
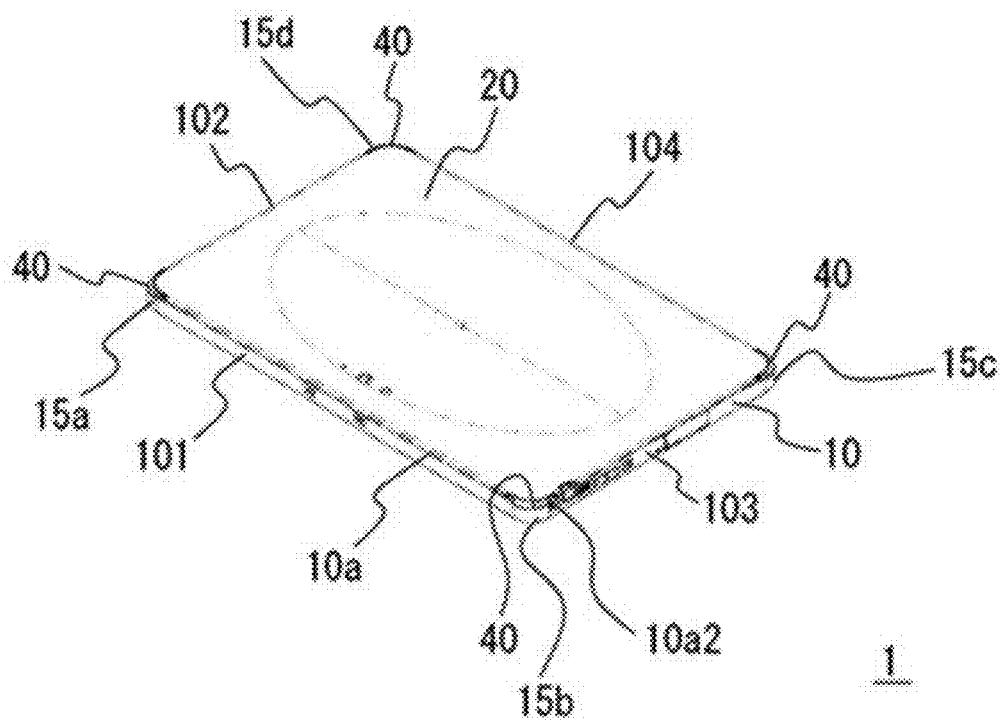
FIGS. 1A and 1B illustrate examples of perspective views of a terminal device.
Figure 1B:
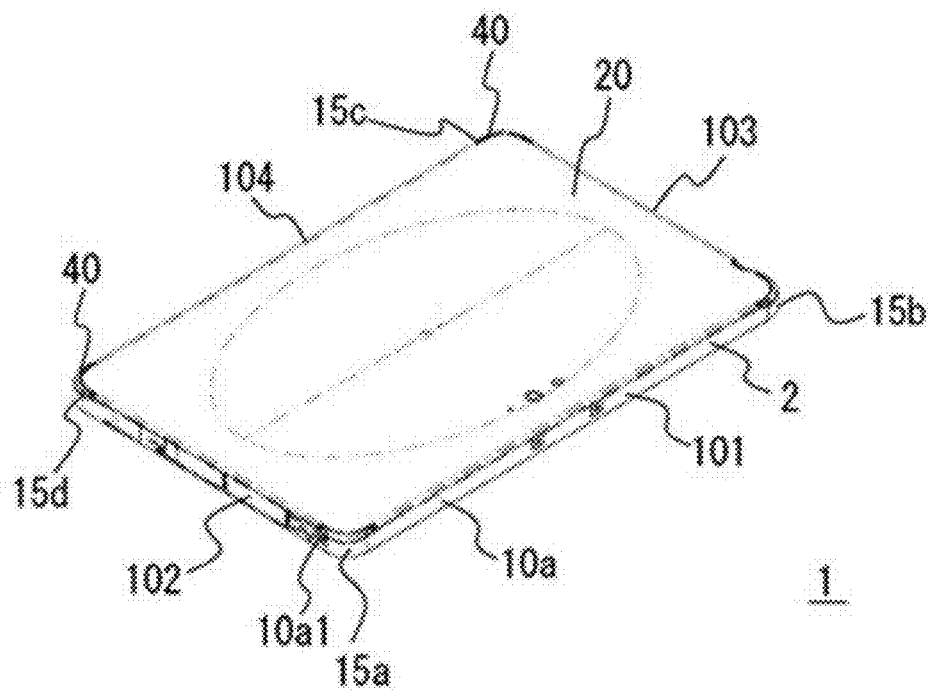
Figure 2:
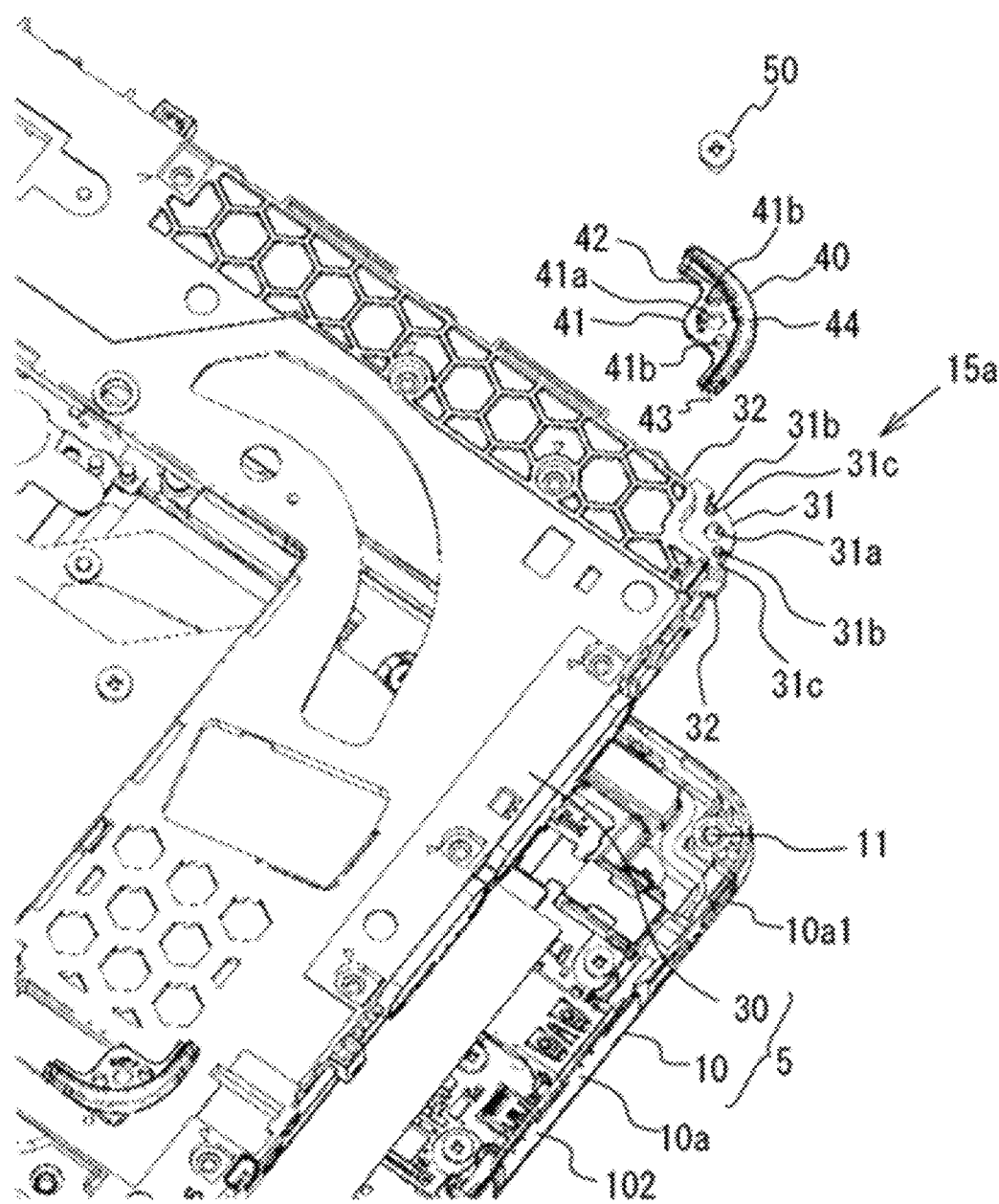
FIG. 2 illustrates an example of a first corner part of the terminal device in an exploded state.
Figure 3:
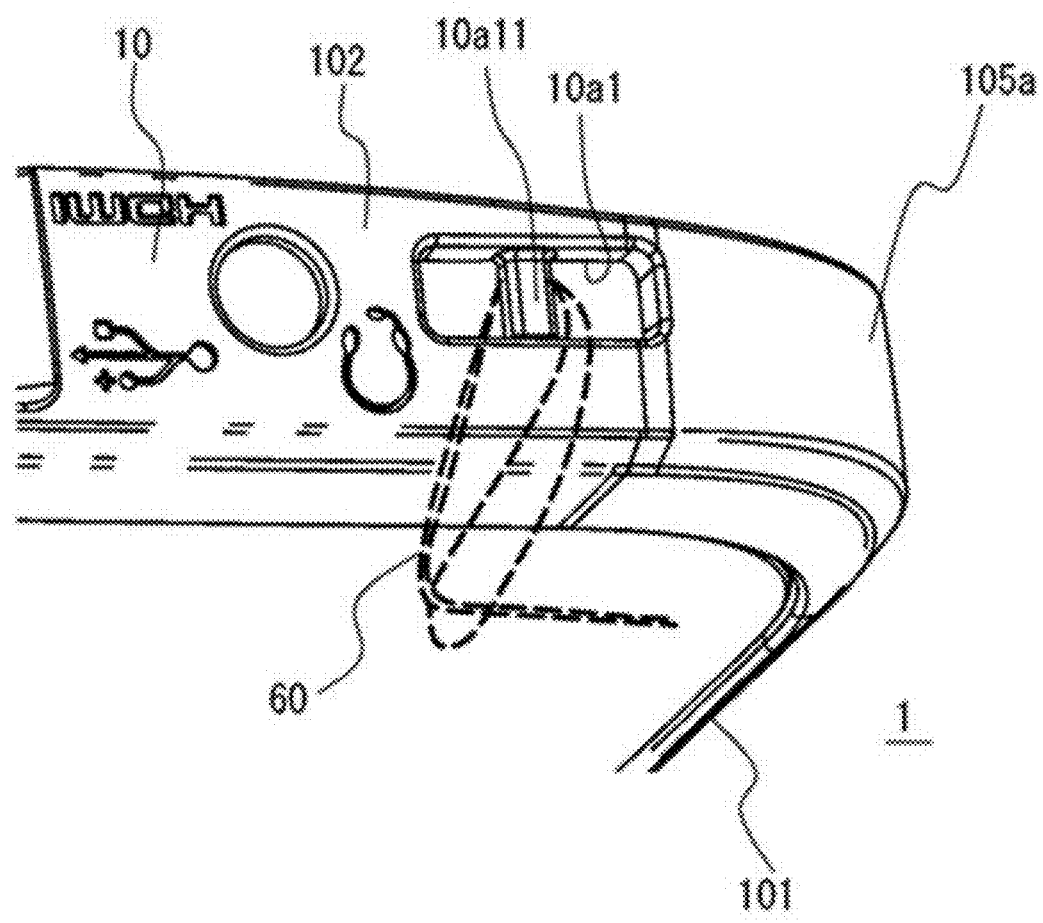
FIG. 3 illustrates an example of the terminal device to which a strap is mounted.
Figure 4A:
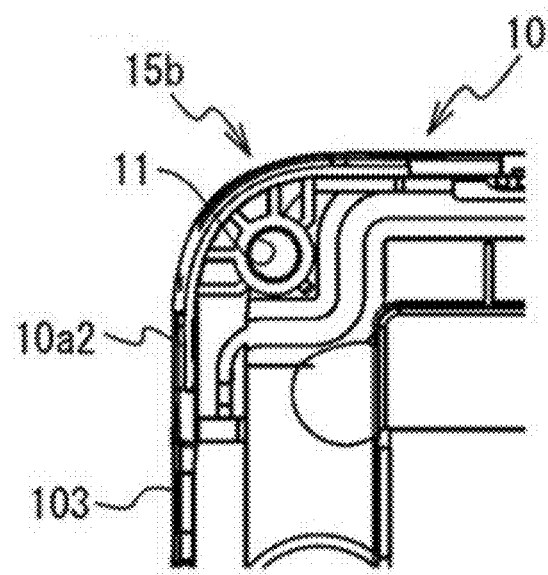
FIGS. 4A to 4C illustrate an example of three-sided views of a second corner part of a front cover.
Figure 4B:
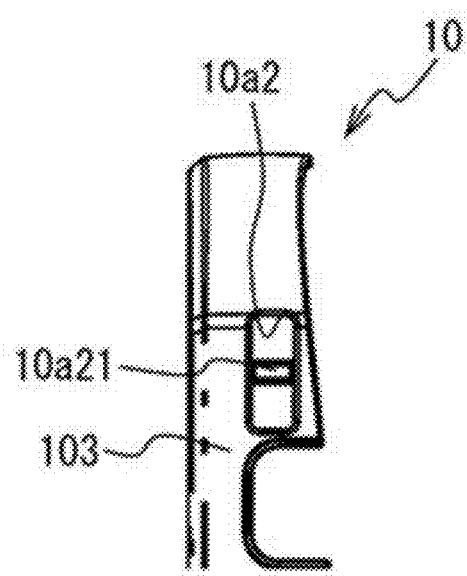
Figure 4C:
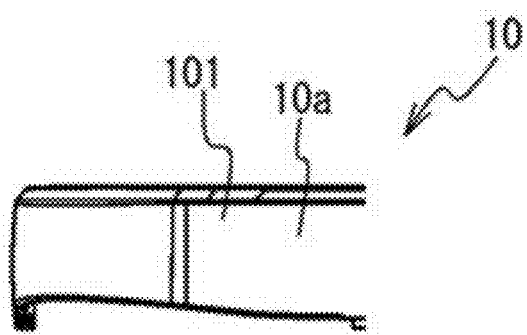
Figure 5A:
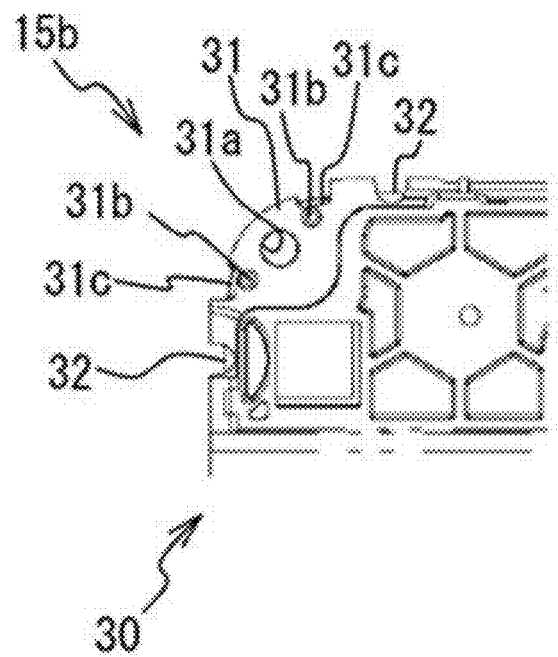
FIGS. 5A to 5D illustrate an example of four-sided views of a second corner part of a middle cover to which a support component is mounted.
Figure 5B:
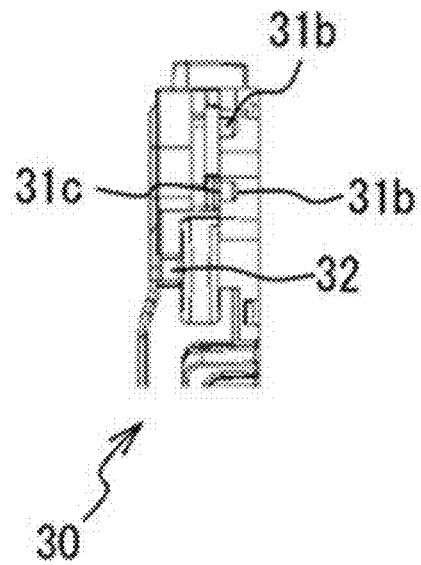
Figure 5C:
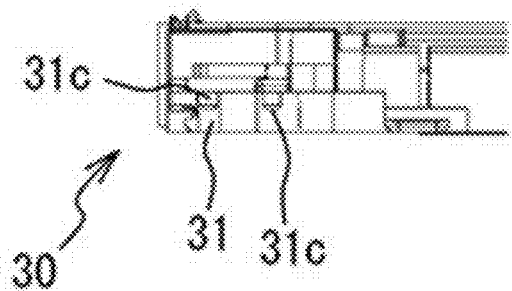
Figure 5D:
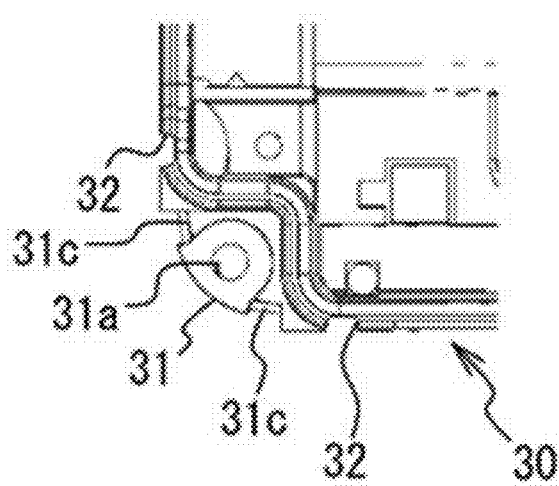
Figure 6:
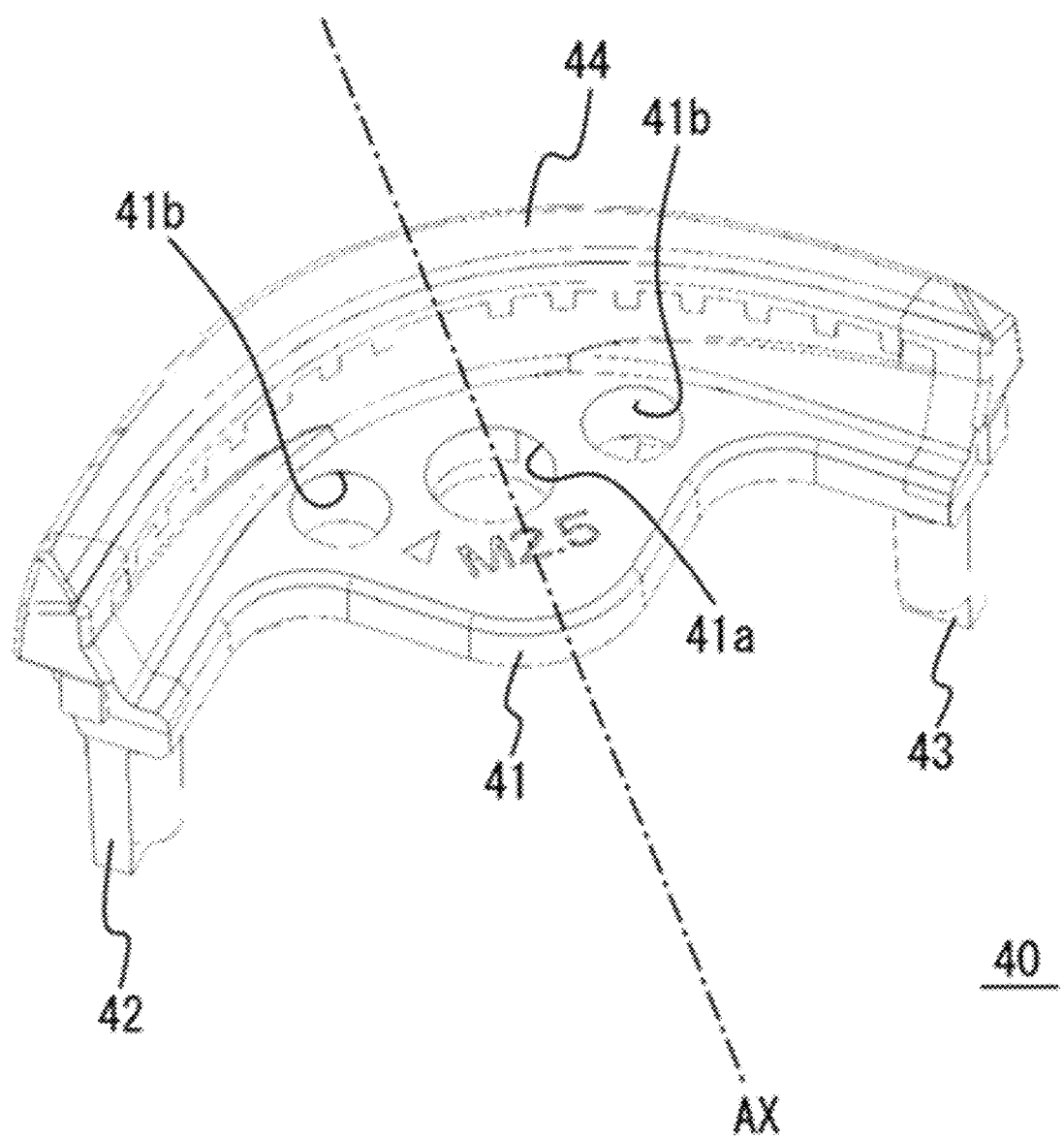
FIG. 6 illustrates an example of a perspective view of the support component seen from the lower surface side.
Figure 7:
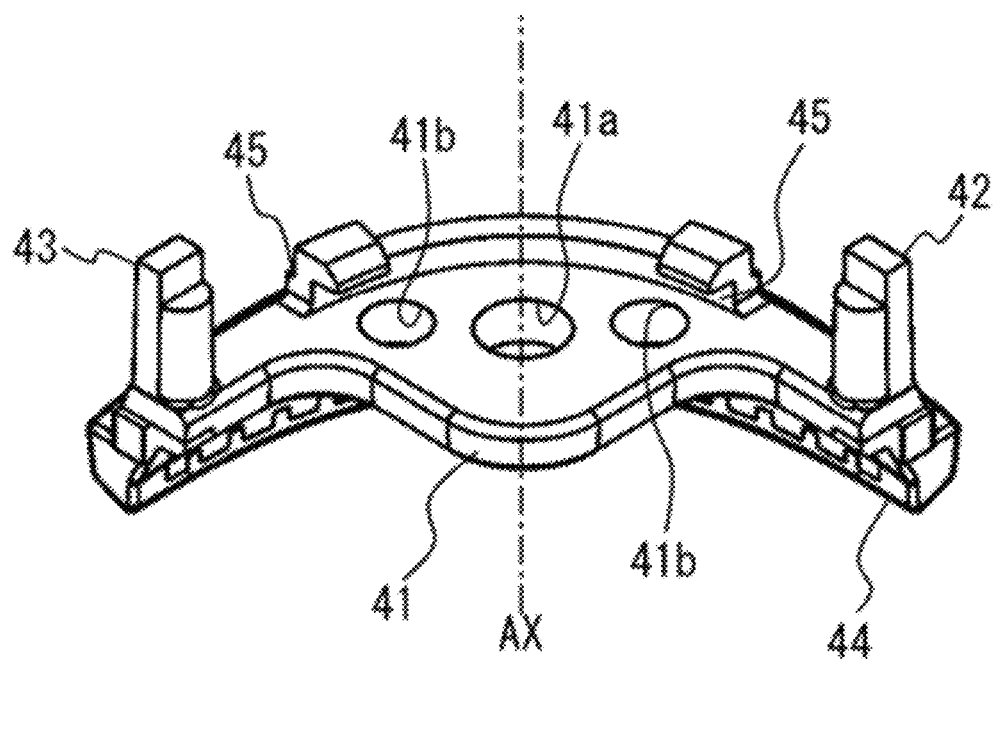
FIG. 7 illustrates an example of a perspective view of the support component seen from the upper surface side.
Figure 8A:
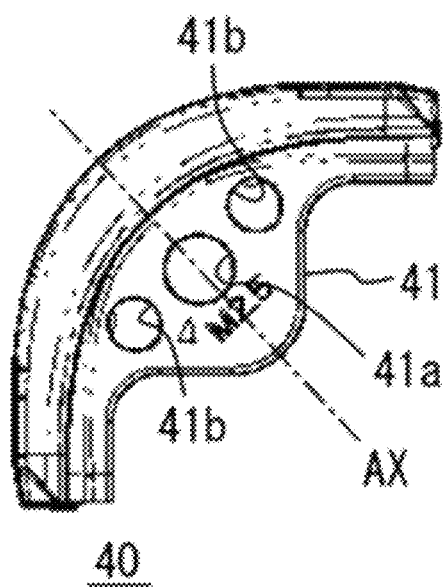
FIGS. 8A to 8C illustrate an example of three-sided views of the support component.
Figure 8B:
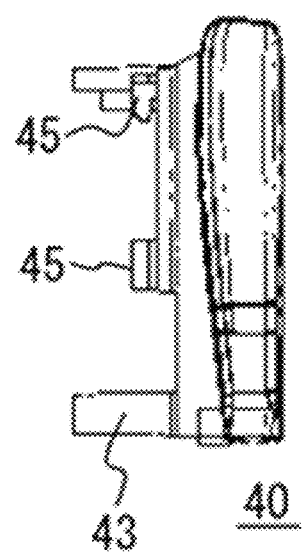
Figure 8C:
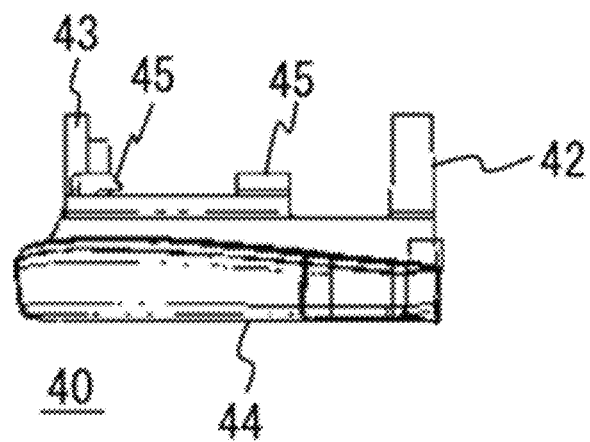
Figure 9A:
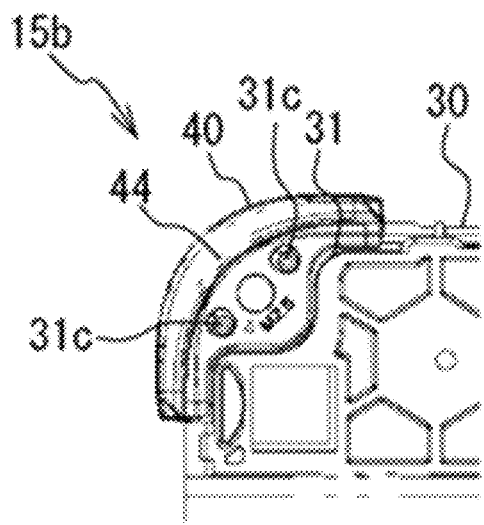
FIGS. 9A to 9D illustrate an example of four-sided views of the second corner part of the middle cover to which the support component is mounted.
Figure 9B:
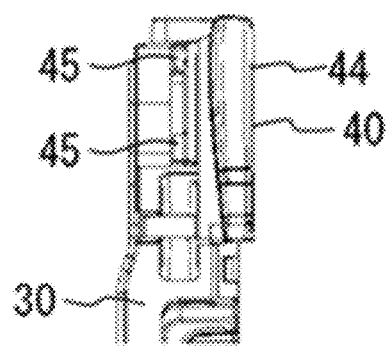
Figure 9C:
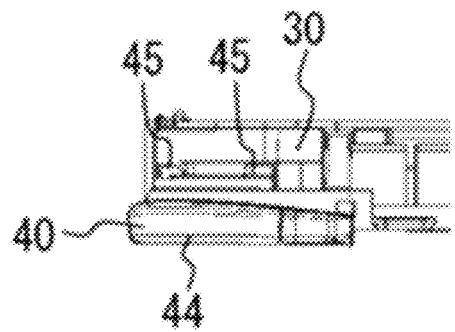
Figure 9D:
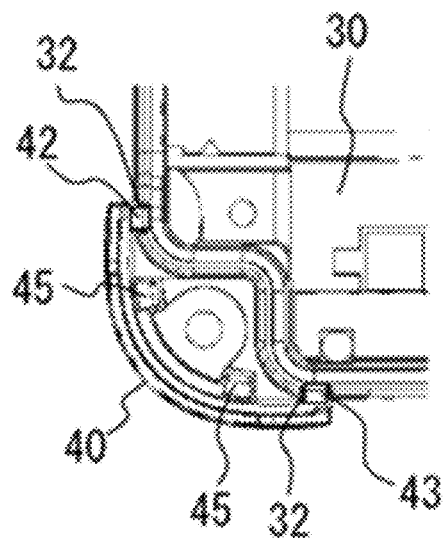

FIGS. 1A and 1B illustrate examples of perspective views of a terminal device. FIG. 2 illustrates an example of a first corner part of the terminal device in an exploded state. FIG. 3 illustrates an example of the terminal device to which a strap is mounted. FIGS. 4A to 4C illustrate an example of three-sided views of a second corner part of a front cover. FIGS. 5A to 5D illustrate an example of four-sided views of a second corner part of a middle cover to which a support component is mounted. FIG. 6 illustrates an example of a perspective view of the support component seen from the lower surface side. FIG. 7 illustrates an example of a perspective view of the support component seen from the upper surface side. FIGS. 8A to 8C illustrate an example of three-sided views of the support component. FIGS. 9A to 9D illustrate an example of four-sided views of the second corner part of the middle cover to which the support component is mounted. FIG. 4A is a plan view, FIG. 4B is a side view, and FIG. 4C is a top view. A right wall part 103 is depicted in the side view illustrated in FIG. 4B, and an upper wall part 101 is depicted in the top view illustrated in FIG. 4C. FIG. 5A is a plan view, FIG. 5B is a side view, FIG. 5C is a top view, and FIG. 5D is a bottom view. A face depicted in the plan view may be a face opposed to a middle cover 30, and a face depicted in the bottom view may be a face opposed to a front cover 10.

A terminal device 1 may be, for example, a tablet PC, and a strap 60 is mounted thereto as illustrated in FIG. 3. Mounted to the strap 60 is a touch pen that comes into contact with a screen included in the terminal device 1 to allow various kinds of operations of the terminal device 1 to be performed. The terminal device 1 may be a smartphone, a game machine, or other devices as long as it allows the strap 60 to be mounted thereto, and a touch pen or the like may be mounted to the strap 60 also in these cases.

With reference to FIGS. 1A and 1B, the terminal device 1 includes the front cover 10 and a rear cover 20. With reference to FIG. 2, the terminal device 1 includes the middle cover 30. The front cover 10 includes a frame-shaped part 10a on the periphery thereof. The frame-shaped part 10a has a rectangular shape, and includes the upper wall part 101, a left wall part 102, the right wall part 103, and a lower wall part 104. The middle cover 30 is arranged in the inside of such the frame-shaped part 10a in a nested manner. The front cover 10 and the middle cover 30 are combined with each other to form a case 5. A display screen, a touch panel, and others are incorporated into the front cover 10. A printing board, a battery, other units, and others are mounted on the middle cover 30. For example, the rear cover 20, although the illustration is omitted in FIG. 2, is a decorative sheet that covers the middle cover 30.

The upper wall part 101 of the front cover 10 that forms the case 5 may correspond to a first wall part. The left wall part 102 thereof may correspond to a second wall part. The right wall part 103 thereof may correspond to a third wall part. The left wall part 102 is continuous to the upper wall part 101 at one end portion of the upper wall part 101. A continuous part between the left wall part 102 and the upper wall part 101 serves as a first corner part 15a. The right wall part 103 is continuous to the upper wall part 101 at the other end portion of the upper wall part 101. A continuous part between the right wall part 103 and the upper wall part 101 serves as a second corner part 15b. A continuous part between the lower wall part 104 and the right wall part 103 forms a third corner part 15c, and a continuous part between the lower wall part 104 and the left wall part 102 forms a fourth corner part 15d. Each of the upper wall part 101, the left wall part 102, the right wall part 103, and the lower wall part 104 is a wall part that forms one side of the frame-shaped part.

An opening part 10a1 is provided in the left wall part 102 corresponding to the second wall part. The opening part 10a1 is positioned at an upper end portion of the left wall part 102. An opening part 10a2 is provided in the right wall part 103 corresponding to the third wall part. The opening part 10a2 is provided at an upper end portion of the right wall part 103. Both of the opening part 10a1 and the opening part 10a2 are provided so as to pass the strap 60 therethrough. The opening part 10a1 is provided on the left side of the case 5 and the opening part 10a2 is provided on the right side of the case 5 in this manner so as to be available for either of a right-handed user and a left-handed user of the terminal device 1 when a touch pen is mounted to the strap 60. For example, the opening part 10a1 and the opening part 10a2 are provided in such a manner that the strap 60 does not lie over a display screen that is incorporated into the front cover 10 when the touch pen is in use.

The opening part 10a1 is provided at the upper end portion in the left wall part 102, for example, at a position near the first corner part 15a. The opening part 10a2 is provided at the upper end portion in the right wall part 103, for example, at a position near the second corner part 15b. With reference to FIG. 3, an auxiliary support 10a11 is provided in the opening part 10a1. The auxiliary support 10a11 forms, with a second support part 43 included in a support component 40, a portion to which the strap 60 is mounted. The opening part 10a1 only has to allow the strap 60 to pass therethrough, and may have a form including no auxiliary support 10a11. For example, the strength of the portion to which the strap 60 is mounted may be increased with the auxiliary support 10a11. With reference to FIG. 4B, an auxiliary support 10a21 of a similar form is provided also in the opening part 10a2.

With reference to FIG. 2, a screw hole 11 is provided in the front cover 10 at a position corresponding to the first corner part 15a. Similarly, with reference to FIG. 4A, the screw hole 11 is also provided in the front cover 10 at a position corresponding to the second corner part 15b. For example, the similar screw holes are respectively provided in the front cover 10 at positions corresponding to the third corner part 15c and fourth corner part 15d.

With reference to FIG. 2, a support component mounting part 31 is provided in the middle cover 30 at a position corresponding to the first corner part 15a. The support component mounting part 31 is provided so as to have a level difference from the surrounding and to be recessed toward the front cover 10 side. A screw inserting hole 31a is provided in the support component mounting part 31. Two positioning protruding parts 31b are provided. The two positioning protruding parts 31b are laterally symmetrically provided with respect to a line, as a center line, that connects a center point of the middle cover 30 and the screw inserting hole 31a. Locking groove parts 31c are provided at two places in the support component mounting part 31. These two locking groove parts 31c are also laterally symmetrically provided similar to the positioning protruding parts 31b. The support component mounting part 31 includes support inserting parts 32 at two places. These two the support inserting parts 32 are also laterally symmetrically provided similar to the positioning protruding parts 31b and the locking groove parts 31c. With reference to FIGS. 5A to 5D, the similar support component mounting part 31 is also provided in the middle cover 30 at a position corresponding to the second corner part 15b. For example, the similar support component mounting parts are provided in the middle cover 30 also at positions corresponding to the second corner part 15b to the fourth corner part 15d.

The support component 40 is mounted to the first corner part 15a of the terminal device 1. For example, the support component 40 that is mounted to the support component mounting part 31 is fixed to the front cover 10 with the middle cover 30 interposed therebetween by a screw 50. The support component 40 is similarly mounted to each of the second corner part 15b to the fourth corner part 15d.

The support component 40 includes a first support part 42 and the second support part 43 that are laterally symmetrically arranged with respect to a center axis AX, and each of which may lock the strap 60. The center axis AX matches a line that connects a center point of the case 5 and a vertex of each of the first corner part 15a to the fourth corner part 15d when the support component 40 is mounted to the case 5. The support component 40 is mounted to each of the first corner part 15a to the fourth corner part 15d. The first support part 42 and the second support part 43 are laterally symmetrically provided with respect to the center axis AX, so that the first support part 42 and the second support part 43 exhibit the same function even in a case where the support component 40 is mounted to a different corner part. For example, although the support component 40 is mounted to each of the first corner part 15a to the fourth corner part 15*d*, the support components 40 only have to be mounted to at least the first corner part 15*a* and the second corner part 15*b*. The support component 40 mounted to the first corner part 15*a* and the support component 40 mounted to the second corner part 15*b* may be exchanged.

The support component 40 includes a main body part 41 that is bent so as to fit with the shape of each of the first corner part 15*a* to the fourth corner part 15*d* to which the main body part 41 is mounted. The first support part 42 and the second support part 43 are respectively provided at end portions of the main body part 41. The main body part 41 may be made of polycarbonate. The main body part 41 includes a screw inserting hole 41*a* with the center through which the center axis AX passes. On both sides thereof, provided are positioning holes 41*b* at positions that are laterally symmetric with respect to the center axis AX. The main body part 41 includes locking claw parts 45 at positions that are laterally symmetric with respect to the center axis AX.

The support component 40 includes a non-slip part 44 that is two-color molded with the main body part 41. The non-slip part 44 may be molded of an elastomer. The non-slip part 44 suppresses the terminal device 1 from slipping when the terminal device 1 is placed and used on a desk, for example.

Such the support component 40 is mounted to the middle cover 30 as illustrated in FIGS. 9A to 9D. In this process, the positioning protruding parts 31*b* provided in the support component mounting part 31 are engaged with the positioning holes 41*b*. The locking claw parts 45 are locked in the locking groove parts 31*c* provided in the support component mounting part 31. Accordingly, the support component 40 is in a state of being temporarily fixed to the middle cover 30. In this process, the first support part 42 and the second support part 43 are respectively positioned in the support inserting parts 32. The support component 40 is fixed to the middle cover 30 and the front cover 10 with the screw 50. Although FIGS. 9A to 9D illustrate the second corner part 15*b*, the same may be applied to the first corner part 15*a*.

Figure 10A:
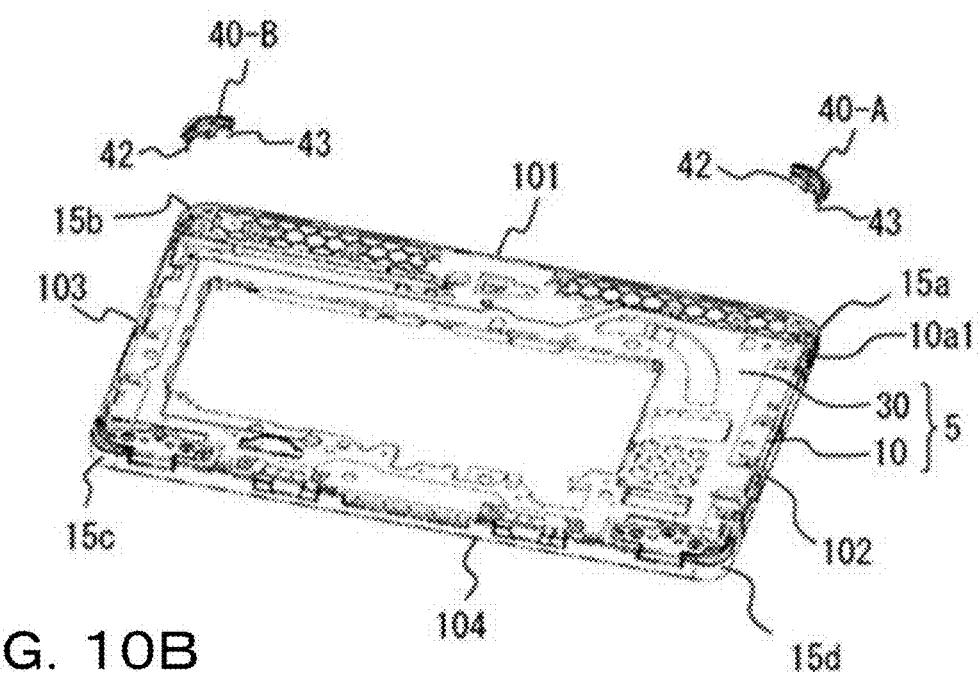
FIGS. 10A and 10B illustrate an example in a case where support components are exchanged.

Although the illustration is omitted in FIGS. 9A to 9D, the middle cover 30 is combined with the front cover 10. With reference to FIGS. 2 and 10A, the second support part 43 of the support component 40 that is mounted to the first corner part 15*a* is exposed from the opening part 10*a*1 that is provided in the left wall part 102. With reference to FIG. 10A, the first support part 42 of the support component 40 that is mounted to the second corner part 15*b* is exposed from the opening part 10*a*2 that is provided in the right wall part 103. The strap 60 may be mounted to the case 5 on either of the left and right sides.

For example, the second support part 43 is used for mounting the strap 60 in the first corner part 15*a*, and the first support part 42 is used for mounting the strap 60 in the second corner part 15*b*.

Figure 10B:
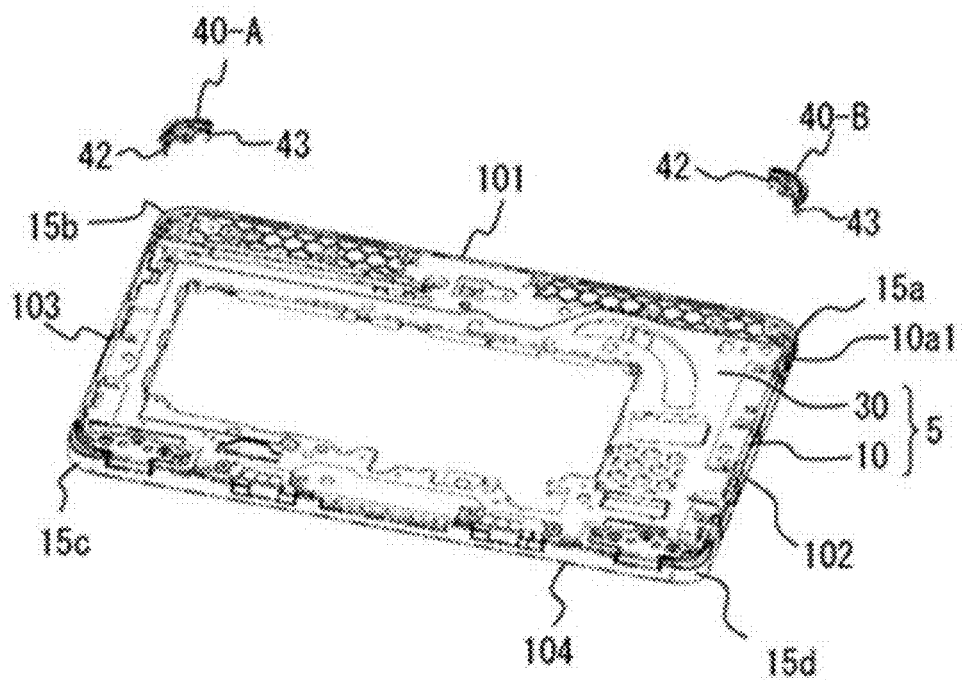
Figure 12:
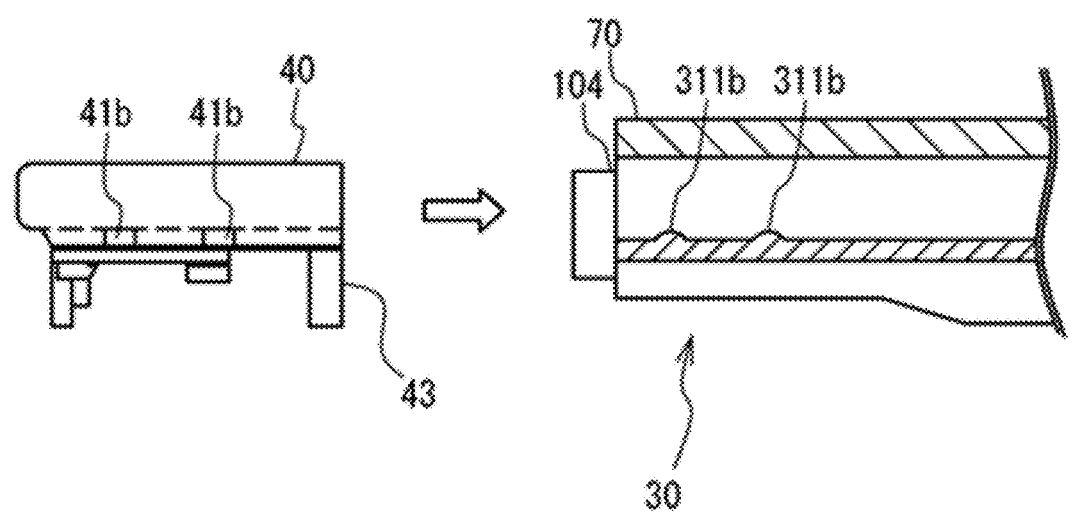
FIG. 12 illustrates an example in a case where the support component is mounted by sliding.

FIGS. 10A and 10B illustrate an example in a case where support components are exchanged. FIG. 11 illustrates an example in a case where support components that are disposed to four corner parts are exchanged. FIG. 12 illustrates an example in a case where a support component is mounted by sliding. Hereinafter, for easy understanding of an explanation, reference numbers of 40-A and 40-B are respectively assigned to two support components 40. As illustrated in FIG. 10A, a support component 40-A is mounted to the first corner part 15*a*, and a support component 40-B is mounted to the second corner part 15*b*. In this state, for example, it is assumed that a user of the terminal device 1 mounts the strap 60 to the support component 40-A side for easy use with his/her dominant hand. A touch pen is mounted to the strap 60. In this case, as for the strap 60, the strap 60 is mounted to the second support part 43 of the support component 40-A. For example, the second support part 43 may be damaged due to a use status. For example, the terminal device 1 has a weight, and when the strap 60 is carelessly pulled in a state where the terminal device 1 is difficult to be moved on the desk, the second support part 43 may be broken. In this manner, when the support component 40-A that is mounted to the first corner part 15*a* is in use, the strap 60 may not be mounted to the second corner part 15*b* that is mounted to the support component 40-B. For example, the second support part 43 of the support component 40-B is not exposed from the case 5, so that the strap 60 may not be mounted thereto. Therefore, if the support component 40-A and the support component 40-B are not exchanged before, the second support part 43 of the support component 40-B may not be damaged.

For example, as illustrated in FIG. 10B, the support component 40-A and the support component 40-B are exchanged. Accordingly, in the first corner part 15*a*, the second support part 43 having no damage is exposed from the opening part 10*a*1. The strap 60 may be again mounted to the second support part 43 that is exposed from the opening part 10*a*1. In this manner, exchanging the support component 40-A and the support component 40-B may cause the terminal device 1 to early recover in an available state of the strap 60. For example, the terminal device 1 is in a state where an extra component is provided in advance, so that the strap 60 may become in the available state without a newly component being ordered.

In the state illustrated in FIG. 10A, even when the first support part 42 of the support component 40-B that is mounted to the second corner part 15*b* is damaged, the first support part 42 may be again used if the support component 40-A and the support component 40-B are exchanged.

In the terminal device 1, four corner parts of the case 5 that includes the rectangular frame-shaped part 10*a*, for example, the first corner part 15*a* to the fourth corner part 15*d* respectively include the support component 40-A to a support component 40-D. Therefore, the support component 40 that is mounted to the first corner part 15*a* may be replaced three times. Therefore, the strap 60 may be in the available state over the long term without the support component 40 being newly ordered.

The terminal device 1 includes a docking station that allows a key board and others to be connected, in the lower wall part 104 of the case 5. With reference to FIG. 12, a plate member 70 that forms the docking station is arranged in the lower wall part 104. The plate member 70 covers a support component mounting part 311. Therefore, the support component 40 is difficult to be mounted to the support component mounting part 311. To cope with that, the support component mounting part 311 that is provided in the lower wall part 104 includes positioning protruding parts 311*b* the height of which is lower than that of the positioning protruding parts 31*b* provided in the support component mounting part 31 and each have a hemisphere shape. Such the positioning protruding parts 311*b* cause the support component 40 to slip into the lower side of the plate member 70, and to form a state in which the support component 40 is temporarily fixed to the support component mounting part 311.

Figure 13A:
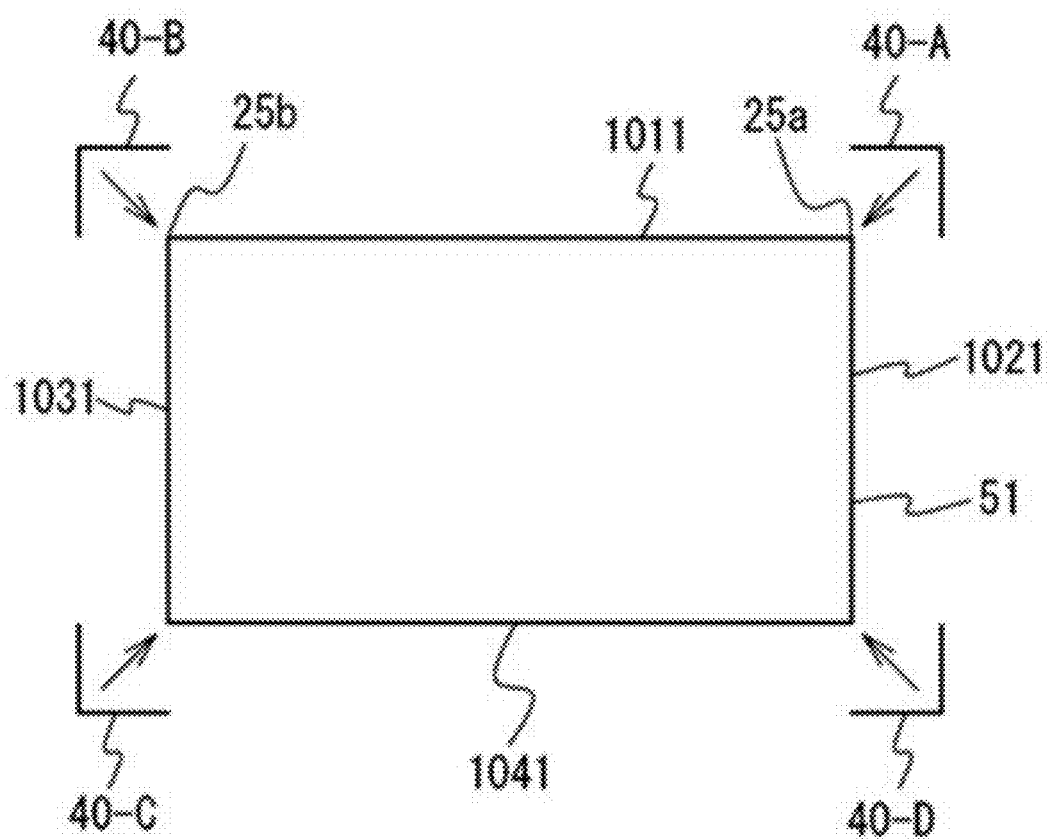
FIGS. 13A and 13B illustrate an example of arrangement of opening parts.
Figure 13B:
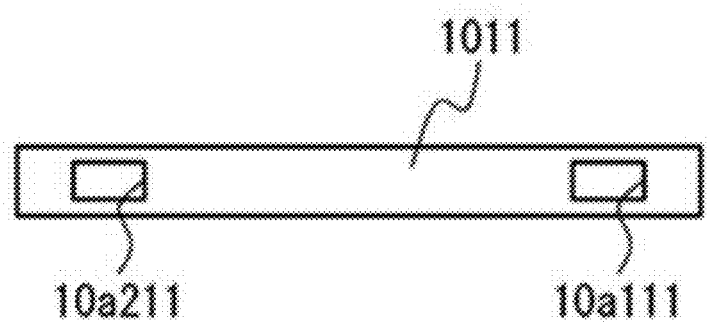

FIGS. 13A and 13B illustrate an example of arrangement of opening parts. The abovementioned terminal device 1 includes the opening part 10*a*1 at the upper end portion of the left wall part 102, and includes the opening part 10*a*2 at the upper end portion of the right wall part 103. For example, in the terminal device, opening parts may be respectively provided at a lower end portion of the left wall part 102 and at a lower end portion of the right wall part 103. For example, the opening parts may be provided at positions having a relation that the support components 40 having the same shape are exchanged to allow the support part to recover to be available. In this manner, the opening parts may be provided at positions that allow the support components 40 to be used by being exchanged.

For example, prepared is a case 51 that includes opening parts 10a111 and 10a211 allowing the strap 60 to pass therethrough, respectively at least at one end portion and the other end portion of a wall part that forms one side of the rectangular frame-shaped part. The support component 40-A and the support component 40-B are respectively mounted to a first corner part 25a that includes one end portion of the wall part at one end portion and a second corner part 25b that includes the other end portion of the wall part. For example, the case 51 includes an upper wall part 1011, a left wall part 1021, a right wall part 1031, and a lower wall part 1041. An opening part 10a111 is provided on one end portion of the upper wall part 1011, and an opening part 10a211 is provided on the other end portion of the upper wall part 1011. A first support part included in the support component 40-A is exposed from the opening part 10a111, and a second support part included in the support component 40-B is exposed from the opening part 10a211. Also in such a combination, exchanging the support component 40-A and the support component 40-B may cause the damaged support part to recover in an available state.

For example, in FIG. 13, arranging the support component 40-A to the support component 40-D in the respective corner parts may result in the replacement of the support component 40 a plurality of times. For example, in FIG. 13, neither of the opening part 10a111 nor 10a211 includes an auxiliary support, however, may include the auxiliary support similar to FIG. 3 or FIG. 4.

The opening parts 10a111 and 10a211 may be provided on one end side and the other end side of the lower wall part 1041.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
    support components each including a first support part and a second support part that are laterally symmetrically arranged with respect to a center axis and each of the first support part and the second support part locks a strap; and
    a case to which the support components are attached removably,
    the case includes:
        a first wall part of a rectangular frame-shaped part,
        a second wall part provided so as to be continuous with the first wall part at a first end portion of the first wall part,
        a third wall part provided so as to be continuous with the first wall part at a second end portion of the first wall part,
        a first opening part, opened at the second wall, through which the strap passes,
        a second opening part, opened at the third wall, through which the strap passes,
    wherein the support components are mounted to a first corner part formed with the first wall part and the second wall part and a second corner part formed with the first wall part and the third wall part, respectively, and at least one of the first support part and the second support part each of the support components is exposed from each of the first and second opening parts.

2. The terminal device according to claim 1, wherein the first wall part is arranged on an upper side of the case, and the first and second opening parts are respectively provided at at least an upper end portion of the second wall part and an upper end portion of the third wall part.

3. The terminal device according to claim 1, wherein at least one of the first and second opening parts includes an auxiliary support which crosses an opening from one end of at least one of the first and second opening parts to another end of at least one of the first and second opening parts.

4. The terminal device according to claim 1, wherein each of the support components includes a non-slip part.

5. The terminal device according to claim 1, wherein other support components are mounted to end portions of a fourth wall part of the rectangular frame-shaped part opposite to the first wall part, respectively.

6. A terminal device comprising:
    support components each including a first support part and a second support part that are laterally symmetrically arranged with respect to a center axis, and each of which is configured to lock a strap; and
    a case to which the support components are attached removably,
    the case includes:
        a first opening part through which the strap passes and which is opened at a first wall part that forms one side of a rectangular frame-shaped part,
        a second opening part through which the strap passes and which is opened at a second wall part that forms another side of the rectangular frame-shaped part opposite to the one side of the rectangular frame-shaped part,
    wherein the respective support components are mounted to a first corner part including one end portion of the first wall part and a second corner part including one end portion of the second wall part, and the first support part of one of the support components is exposed from the first opening part provided and the second support part of other of the support components is exposed from the second opening part.

7. The terminal device according to claim 6, wherein at least one of the first and second opening parts includes an auxiliary support which crosses an opening from one end of at least one of the first and second opening parts to another end of at least one of the first and second opening parts.

8. The terminal device according to claim 6, wherein each of the support components includes a non-slip part.

9. The terminal device according to claim 1, wherein:
    the first support part that is arranged in a first portion on a first side with respect to the center axis, and is configured to lock the strap;
    the second support part that is arranged in a second portion that is provided on a second side with respect to the center axis and is continuous to the first portion, the second support part being laterally symmetrically arranged with the first support part;

a locking part that is arranged between the first support part and the second support part, and configured to temporarily fix the support component to the case; and a first hole that is arranged next to the locking part, and configured to fix the support component to the case.

10. The support component according to claim 9, wherein second holes are laterally symmetrically arranged with respect to the center axis in such a manner that the first hole is provided between the second holes, and position the support component with respect to the case.

* * * * *